April 1, 1958 D. T. AYERS, JR 2,828,719
BOOSTER MOTOR MECHANISM
Filed March 29, 1954 4 Sheets-Sheet 1

Fig. 1.

INVENTOR.
DAVID T. AYERS Jr.
BY John F. Phillips
ATTORNEY

April 1, 1958

D. T. AYERS, JR

2,828,719

BOOSTER MOTOR MECHANISM

Filed March 29, 1954

INVENTOR
DAVID T. AYERS JR.

BY John F. Phillips

ATTORNEY

April 1, 1958 D. T. AYERS, JR 2,828,719
BOOSTER MOTOR MECHANISM
Filed March 29, 1954 4 Sheets-Sheet 3

INVENTOR.
DAVID T. AYERS JR.
BY John H. Phillips
ATTORNEY

April 1, 1958 D. T. AYERS, JR 2,828,719
BOOSTER MOTOR MECHANISM
Filed March 29, 1954 4 Sheets-Sheet 4

INVENTOR.
DAVID T. AYERS JR.
BY John F. Phillips
ATTORNEY

United States Patent Office 2,828,719
Patented Apr. 1, 1958

2,828,719

BOOSTER MOTOR MECHANISM

David T. Ayers, Jr., Birmingham, Mich., assignor to Kelsey-Hayes Company, a corporation of Delaware Application March 29, 1954, Serial No. 419,283

23 Claims. (Cl. 121—41)

This invention relates to a booster brake mechanism.

In the co-pending application of Jeannot G. Ingres, Serial No. 394,683, filed November 27, 1953, there is disclosed and claimed a highly efficient type of booster brake mechanism employing a fluid motor using vacuum as a source of power, and energization of the motor is utilized for reacting against the pedal-operated control mechanism to provide in the pedal a degree of "feel" proportional to energization of the motor. In accordance with desired practice, the mechanism referred to provides a "soft" pedal, namely, a pedal which moves from the off position against the relatively light resistance of a biasing spring. The apparatus of the co-pending application also employs a simplified type of valving for the motor, comprising a spool valve movable from off position to energize the motor. When motor energization has taken place to a predetermined extent, reactions accurring incident to the generation of hydraulic pressure in the master cylinder are transmitted through radial lever devices to the spool valve to provide the pedal with "feel." This reaction is transmitted from the levers to the spool valve through a plate having an annular fulcrum edge engaging the levers and concentrically biased to an off position. When the fulcrum plate is in such off position it is spaced from any pedal-operated element and hence the valve mechanism is movable freely of the fulcrum plate to effect initial energization of the motor.

Such prior construction has been found unusually efficient in operation but possesses disadvantages. For example, initial movement of the pedal from off position takes place solely against the resistance of a relatively light spring within the limits of the play between the fulcrum plate and the pedal-operated parts, and upon initial energization of the motor, the brake pedal tends to "fall away." This condition is somewhat aggravated by the fact that with the type of valve mechanism employed, movement of the spool valve from a sealed off position admits air somewhat too freely to the variable pressure chamber of the motor, resulting in a tendency for the pressure responsive unit of the motor to "jump" away from its normal off position. Motor energization must take place to an appreciable extent before the reaction means comes into operation. These disadvantages are not particularly serious, but it is highly desirable that the operation of a device of this character be made as smooth as possible.

An important object of the present invention is to provide a novel booster brake mechanism of the type referred to wherein an improved lever reaction means is provided and which comes into effect to provide some reaction forces against the brake pedal, in addition to the effect of the light biasing spring, immediately upon energization of the booster motor.

A further object is to provide such a device wherein the concentric biasing spring for the radial levers, provided in the co-pending application referred to, is replaced by eccentric biasing means associated with a pressure diaphragm responsive to pressures in the motor chambers, the eccentric mounting of the spring means providing a diaphragm one side of which is wholly free to respond to any differential pressures in the motor to render such side of the diaphragm effective for transmitting reaction forces to the brake pedal upon initial energization of the motor.

A further object is to provide such an apparatus wherein the control valve mechanism for the motor is improved in such a manner that initial movement of the brake pedal from off position restricts the admission of air into the variable pressure chamber of the motor, thus providing for a slower and more gradual energization of the motor and preventing the pressure responsive unit thereof from "jumping" away from its normal off position when the brake pedal is depressed.

A further object is to provide a brake mechanism employing the features referred to in such novel combination that the improved lever means is instantly responsive to the slight initial energization of the booster motor occurring during initial movement of the brake pedal from its normal off position.

A further object is to provide an apparatus of the the character referred to wherein the sensitiveness of the pressure responsive diaphragm renders it practicable to initially restrict admission of air to the motor to prevent the "jumping" referred to, and wherein the initial responsiveness of the diaphragm to oppose movement of the valve supplements progressively the action of the light valve biasing spring, thus further preventing tendency of the pressure responsive unit of the motor to "jump" away from off position and assist in providing smoothly increasing resistance to movement of the brake pedal away from off position.

A further object is to provide a pressure responsive diaphragm structure of the character referred to in which successive portions of the area of the diaphragm come into operation as motor energization increases, thus further smoothing out the progressively increasing resistance to motor energizing movement of the valve and consequently of the brake pedal.

Other objects and advantages of the invention will become apparent during the course of the following description.

In the drawings I have shown one embodiment of the invention. In this showing.

Figure 1:
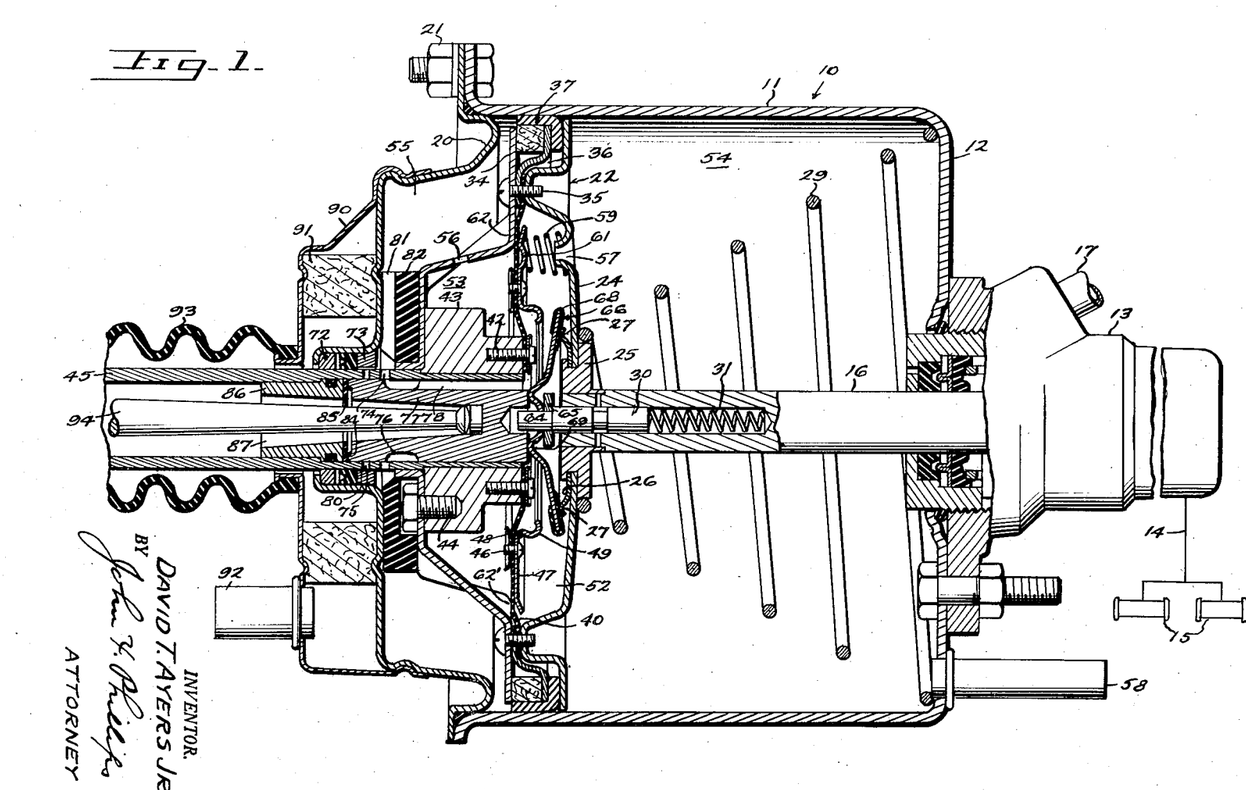
Figure 1 is a sectional view through the booster motor mechanism and associated parts taken substantially on line 1—1 of Figure 4, the master cylinder and other parts being broken away and parts being shown in elevation, all of the elements being shown in their normal off positions.

Referring to Figure 1, the numeral 10 designates a fluid pressure operated booster motor as a whole, shown in the present instance as a vacuum motor of the vacuum suspended type, as will become apparent below. The motor comprises in the present instance a pressed cylinder 11 having an integral head 12 at one end carrying the usual master cylinder 13 having an outlet (not shown) for connection through suitable lines 14 with the vehicle wheel cylinders, two of which have been illustrated diagrammatically in Figure 1 and indicated by the numeral 15. A plunger 16 is movable into the master cylinder to displace fluid therefrom into the brake lines, and the master cylinder fluid is replenished from a suitable reservoir, not shown, through a pipe 17. The master cylinder and associated elements form per se no part of the present invention.

The cylinder 11 is provided at the end opposite the master cylinder with a stamped head 20 secured in position by bolts 21. Within the motor is arranged a pressure responsive unit indicated as a whole by the numeral 22. It will be apparent that the motor in the present instance has been shown as being of the cylinder and piston type, but it will become evident that the invention is not limited to such motor but is equally applicable to a motor of the diaphragm type, now in common use in booster brake mechanisms.

The unit 22 comprises a plate 24 having its peripheral inner edge suitably anchored to a collar 25 fixed to the plunger 16. Adjacent the plate 24 and also fixed to the collar 25 is a fulcrum plate 26 having an annular fulcrum flange 27, as clearly shown in Figure 2. A conventional return spring 29 engages at one end against the head 12 and at its opposite end against the plate 24, the latter end of the spring surrounding the collar 25. A plunger 30, further referred to below, is axially slidable in the plunger 16 and is biased toward the left in Figures 1, 2 and 3 by a spring 31.

The pressure responsive unit 22 further comprises a plate 34 secured to the plate 24 by suitable screws 35. Between the plates 24 and 34 is arranged a supplemental plate 36, and the three plates 24, 34 and 36 cooperate to fix, with respect to the unit 22, a suitable cup assembly 37 slidable in the cylinder 11. The inner edge of the plate 36 is also fixed in position by the screws 35, and interposed between the plates 24 and 36 is the peripherally outer portion of a pressure responsive diaphragm 40.

The inner periphery of the diaphragm is fixed by screws 42 to the adjacent end of a collar 43 which, in turn, is fixed to the plate 34 by screws 44. The plate 34 and the collar 43 are fixed to an axially elongated sleeve 45 forming part of the pressure responsive unit 22.

Figure 2:
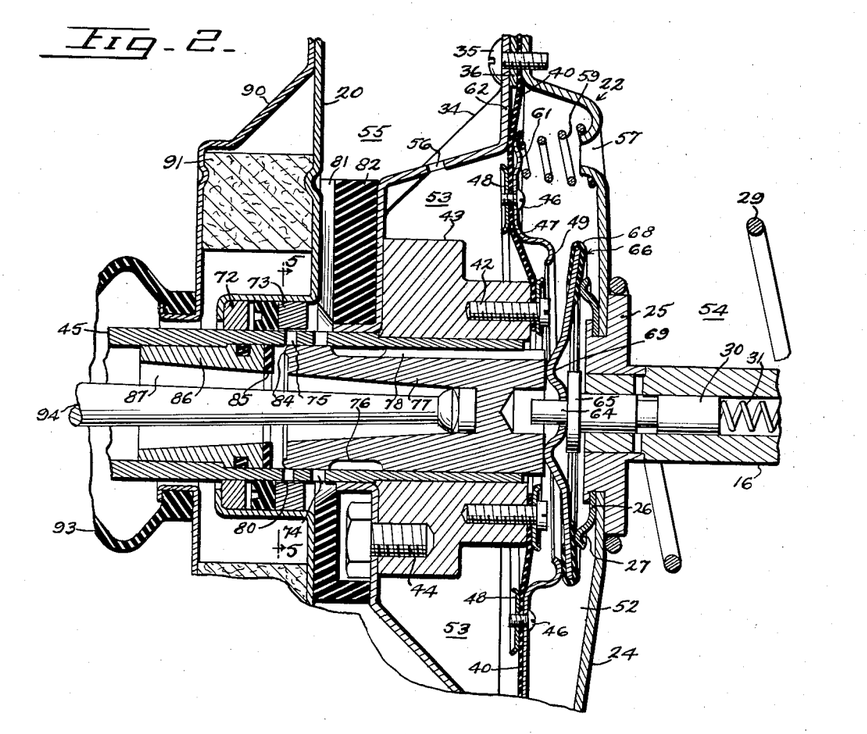
Figure 2 is an enlarged fragmentary sectional view similar to Figure 1, showing the parts in the positions they will occupy upon initial movement of the brake pedal to slightly energize the motor and prior to the point at which the pressure responsive unit of the motor starts to move.
Figure 3:
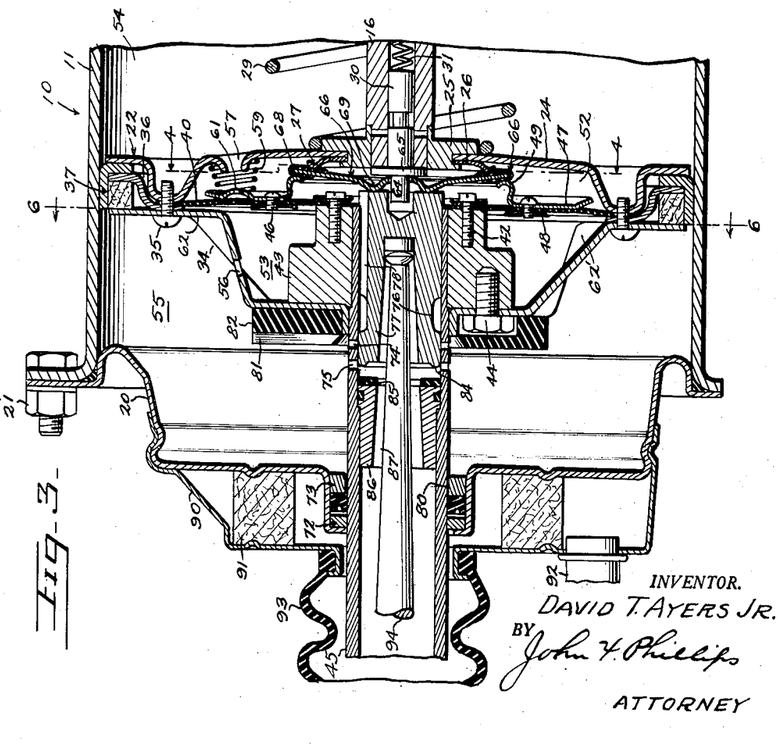
Figure 3 is a fragmentary sectional view similar to Figure 1, with the parts shown in fully motor-energized positions.

The diaphragm 40 is fixed by screws 46 between a pair of plates 47 and 48 the former of which is provided at its inner periphery with an annular flange 49, for a purpose to be described, projecting toward the right from the diaphragm 40 as viewed in Figures 1, 2 and 3. The diaphragm divides the pressure responsive unit 22 to form a pair of chambers 52 and 53. The pressure responsive unit 22 divides the motor to form a constant pressure chamber 54 and a variable pressure chamber 55, the latter of which communicates with the diaphragm chamber 53 through one or more ports 56 stamped through the plate 34. The diaphragm chamber 52 communicates with the motor chamber 54 through suitable ports 57, further referred to below, and the motor chamber 54 is in constant communication with a source of vacuum, such as the intake manifold, through a suitable duct (not shown) connected to a nipple 58.

Figure 4:
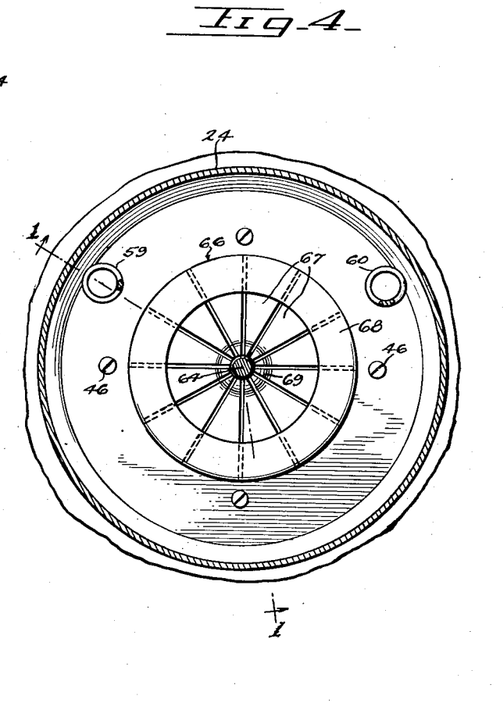
Figure 4 is a fragmentary sectional view on line 4—4 of Figure 3.
Figure 5:
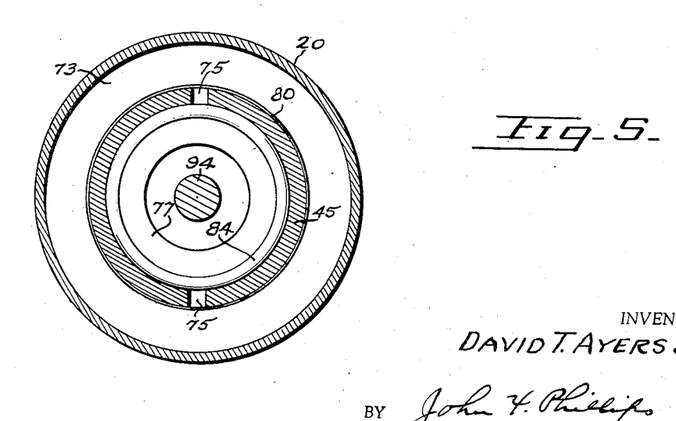
Figure 5 is an enlarged fragmentary sectional view on line 5—5 of Figure 2.

Spring means eccentric to the axis of the motor are employed for biasing one side of the diaphragm 40 to its normal off position. Such means may comprise one or more springs and two springs have been shown in the present instance and indicated by the numerals 59 and 60, these springs being arranged above the axis of the motor as shown in Figure 4. It is preferred that two springs be employed, one stronger than the other. For example, spring 60 may be stronger than spring 59, for a purpose to be described. The openings 57 are formed by punching the metal of the plate 24 into the chamber 52 to form seats for the springs 59 and 60. The left-hand end of each of these springs, as shown in Figure 2, engages the plate 47, the latter being provided with a stamped protuberance 61 coaxial with each spring to form a seat therefor. The plate 34 is stamped to provide a plurality of shoulders 62. One of these shoulders preferably is provided in alinement with each spring 60. Similar shoulders 62′ also have been shown at the bottom of the motor (Figures 1 and 3), but the use of such shoulders is unnecessary since the adjacent portion of the diaphragm 40 is wholly free of any means biasing it for movement in either direction parallel to the axis of the motor.

The plunger 30 is provided with a reduced left-hand end 64, as viewed in Figures 1, 2 and 3, forming a shoulder against which seats a collar 65. This collar normally is disengaged from the adjacent end of the plunger 16 and is movable into engagement therewith under operating conditions to be described, as shown in Figure 3.

A lever unit indicated as a whole by the numeral 66 surrounds the plunger end 64. This lever unit, as shown in Figure 4, is formed of a plurality of adjacent, slightly spaced segmental levers 67, and these levers are bound together by a rubber or other resilient cover 68, bonded thereto and preferably extending around the radially outer ends of the levers. The right side of the lever unit, as viewed in Figure 1, normally engages the fulcrum flange 27. Each lever 67 is provided with a rib 69 projecting toward the left in Figures 1, 2 and 3, for a purpose to be described.

The motor head 20 carries a suitable bearing and sealing unit indicated as a whole by the numeral 72 and including a bearing element 73, further described below. The sleeve 45 is slidable in the unit 72. The sleeve 45 is provided with a pair of sets of ports 74 and 75 spaced from each other longitudinally of the sleeve 45. When the parts are in the off positions shown in Figure 1, the ports 74 communicate at their inner ends with an annular groove 76 formed around a spool valve 77. The groove 76 communicates through a longitudinal valve groove 78 with the diaphragm chamber 52.

When the parts are in the off positions shown in Figure 1, the ports 75 lie within the bearing element 73 which has slight clearance (.005–.010″) relative to the sleeve 45, to provide a restricted clearance 80 between the sleeve 45 and the space to the right of the bearing member 73. Such space communicates directly with the motor chamber 55 through a radial slot 81 formed in a rubber or similar bumper 82 bonded to the wall 34.

The left-hand end of the valve 77 (Figure 2) is provided with an annular valve element 84 engageable with a resilient seat 85 carried by a sleeve 86 stationarily mounted within the sleeve 45. The space 87 within the sleeve 86 communicates with the atmosphere in a manner to be described.

A shell 90 is fixed to the cylinder head 20, and between these two elements is arranged an air cleaner 91 supplied with air through a nipple 92 (Figure 1). The inner periphery of the shell 90 is wholly clear of the sleeve 45 and is connected to one end of a boot 93. This boot, in accordance with what is now conventional practice, extends beyond the end of the sleeve 45 and is fixed to a rod 94 having mechanical connection with the brake pedal and projecting into the valve 77 to actuate the latter, as will be apparent.

*Operation*

The parts normally occupy the off positions shown in

Figure 1. The valve 77 will have its valve element 84 engaging the resilient seat 85, thus preventing any admission of air into the motor. The variable pressure motor chamber will be in communication with the constant pressure chamber 54 through ports 74, grooves 76 and 78 and chamber 52, which communicates with the motor chamber 54 through the spring seat ports 57. The diaphragm chamber 53 is in constant communication with the motor chamber 55 through port 56. Accordingly, the motor will be vacuum-suspended and vacuum will exist in both diaphragm chambers 52 and 53 to balance pressures on opposite sides of the diaphragm 40.

Assuming that the brakes are to be applied, the operator will depress the brake pedal, thus effecting movement of the rod 94 toward the right, carrying with it the valve 77. Initial movement of the valve 77 will bring it to the position shown in Figure 2, at which point the annular groove 76 will be disconnected from the ports 74, and hence the motor chambers 54 and 55 will be disconnected from each other.

It is well known that it is impossible to seal a spool valve against fluid pressure leakage around the surface thereof. As soon as the valve element 84 leaves the resilient seat 85, which acts as a positive seal when the valve is closed, air starts to seep around the lefthand end of the valve 77 even before the valve reaches the position shown in Figure 2. As the valve reaches the latter position, the ports 75 will be relatively widely opened to the air space 87, but the flow of air into the motor chamber 55 will be restricted by the clearance 80 in the bearing member 73. In the structure of the pending application referred to, movement of the valve from the off position admitted air through ports corresponding to the ports 74, resulting in a somewhat too rapid initial operation of the motor, causing the unit to tend to "jump" toward the right as viewed in Figure 2. It will be noted that initial movement of the valve 77 from the off position takes place solely against the tension of the relatively light spring 31. When the motor is too rapidly initially energized, the rapid movement of the pressure responsive unit of the motor, carrying with it the fluid displacing plunger for the master cylinder, relieves the compressive force of the spring 31 against the plunger 30, thus causing the brake pedal to tend to fall away from the operator's foot.

With the present construction, initial energization of the motor is restricted, and accordingly initial movement of the pressure responsive unit 22 is prevented from taking place too suddenly, thus eliminating the operator's feeling that the pedal is falling away from his foot. However, as motor energization progresses, the unit 22 will move to the right and the port 75 will clear the bearing member 73 and be opened to full communication with the motor chamber 55. Accordingly, motor energization is wholly controlled by the valve 77 except in the initial stage of operation when there is restricted communication between the ports 75 and the motor chamber 55 for the purpose stated.

The foregoing advantage in itself is important in smoothing out the operation of the motor, but the restricted initial energization of the motor also cooperates with the diaphragm 40 and lever device 66 in reacting against the valve 77. It will be noted that the diaphragm 40 is biased to the off position solely by the eccentrically arranged springs 59 and 60. One of these springs may be employed, but it is preferred to use two springs, both arranged to one side of the axis of the device to eliminate any biasing force tending to hold the portions of the diaphragm at the opposite side of the device in off position. Therefore, it will be apparent that when the motor is initially energized, the slightest rise in pressure in the motor chamber 55 will move the lower portion of the diaphragm, as viewed in Figure 2, toward the right. Differential pressures affecting the diaphragm 40 will not be sufficient in the initial stages to move the spring-pressed portion of the diaphragm away from its normal off position, and this being the case, when the motor is initially energized as shown in Figure 2, the upper portion of the diaphragm will remain in normal position. The corresponding portion of the rib 49 will remain out of engagement with the adjacent portion of the lever device 66.

However, since there is no biasing force thereagainst, the lower portion of the diaphragm will be moved instantly upon the establishment of pressure in the chamber 55 higher than pressure in the chamber 54. This action will take place prior to actual movement of the pressure responsive unit 22, since a predetermined differential motor pressure is necessary to move the unit 22 against the compression of the motor return spring 29, etc. As soon as any energization of the motor occurs, therefore, the lower portion of the diaphragm 40 will move to the right as viewed in Figure 2 and the corresponding portion of the rib or flange 49 will engage the adjacent portion of the lever device 66.

Depending upon the degree of motor energization, the lower portion of the rib 49 will exert a force to the right against the radially outer ends of the lever elements 67 in the lower portion of the device. This force will be exerted radially outwardly of the contact line of the fulcrum flange 27, and accordingly the radially inner ends of the affected lever elements 67 will exert a force against the valve 77 opposing movement thereof toward the right.

It will be apparent, therefore, that the first increment of movement of the brake pedal from off position takes place solely against the spring 31 and that immediately upon initial energization of the motor, even though such energization is slight because of the clearance 80, certain of the lever elements 67 will be utilized to add to the force of the spring 31 so that there will be a smooth progressive building-up of reaction forces against the valve 77. The leverage of the initially affected lever elements 67 is such that in initial stages of motor energization, the reaction forces are relatively light. However, these forces progressively increase as greater differential pressures affect the free or lower portion of the diaphragm 40, and this slow progressive building-up of reaction forces is rendered very smooth by the particular mounting of the diaphragm 40 without biasing means at one side thereof and by the use of the restricted admission of air into the motor chamber 55 by the means described above.

Accordingly, there is no falling away of the brake pedal and there is no sudden reaction transmitted through the valve to the brake pedal when motor energization reaches a predetermined point. The forces transmitted by the free portion of the diaphragm will progressively increase from zero until the point is reached where differential pressures in the chambers 52 and 53 will be sufficient to overcome first the compressive force of the spring 59 and then of the spring 60, whereupon the upper portion of the diaphragm will become effective against the associated lever elements 67 for reacting against the valve 77.

Figure 6:
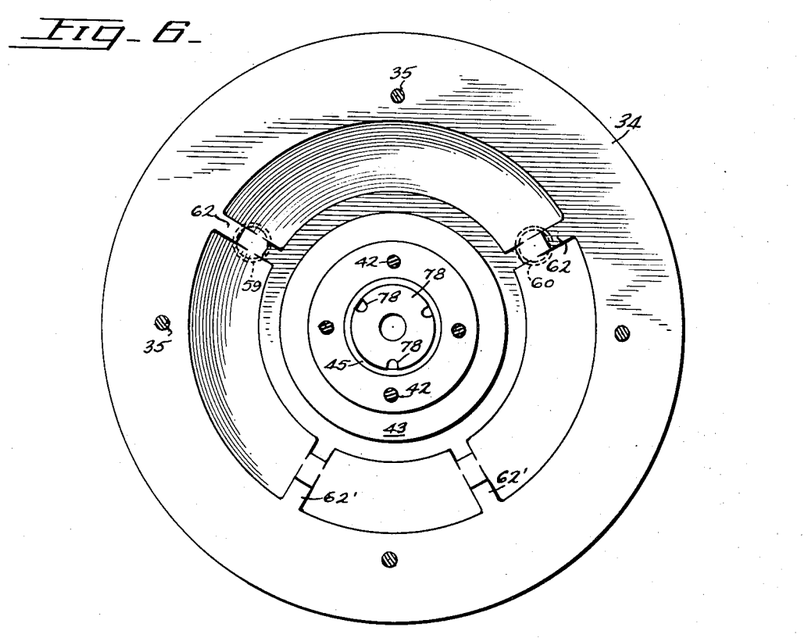
Figure 6 is a section taken substantially on line 6—6 of Figure 3, the motor cylinder being omitted.

During initial stages of energization of the motor during which the lower portion of the diaphragm 40 moves to the right while the springs 59 and 60 prevent movement of the upper end of the diaphragm, the movement takes place with the diaphragm bearing on the shoulders 62 (Figure 6), the springs 59 and 60 corresponding in position to the respective shoulders 62. The diaphragm accordingly rocks on the shoulders 62, these shoulders functioning as fulcrum supports for the diaphragm.

As previously stated, one of the springs 59 or 60 is stronger than the other. Assuming that the spring 59 is the weaker of the two, the differential pressures in the chambers 52 and 53 will reach the point where the force of the spring 59 will be overcome before this occurs with respect to the spring 60. When the spring 59 is overcome, the portion of the diaphragm 40 in the region of this spring will move it away from its shoulder 62, with the diaphragm then bearing against and rocking on the shoulder 62 associated with the spring 60, and this moves additional portions of the area of the diaphragm toward the right to render additional lever segments 67 effective for resisting movement of the valve 77 toward the right.

As motor energization increases, the point will be reached in which the pressure in the chamber 53 will be sufficient to overcome the compression of spring 60 to move the adjacent portion of the diaphragm toward the right until the point is reached in which the entire circumference of the flange 49 will bear against the lever unit 66 to render all of the lever elements 67 effective for resisting movement of the valve 77. Of course, as differential pressures increase in the chambers 52 and 53, the initially affected portions of the diaphragm at the bottom thereof will exert progressively increasing forces against the lower element 67. During the interim between the overcoming of the spring 59 and the overcoming of the spring 60, pressures affecting the portion of the diaphragm previously rendered ineffective by the spring 59 will be subject to progressively increasing pressures to apply increasing forces through the lever elements to the valve 77. After both springs 59 and 60 have been overcome, differential motor pressures will continue progressively to affect the diaphragm and increase reaction forces against the valve 77.

Figures 7, 8:
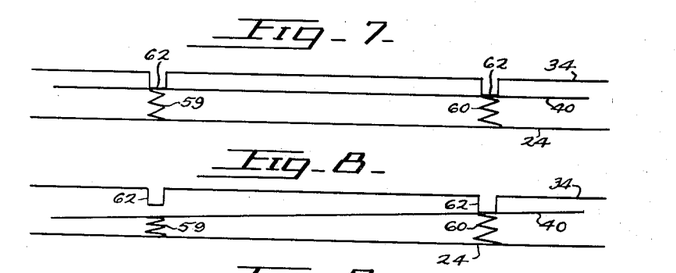
Figure 7 is a diagrammatic plan view showing the relationship of certain of the parts when the motor is de-energized or only slightly energized.
Figure 8 is a similar view showing the relation of the parts when the motor is energized to a substantial extent.
Figure 9:
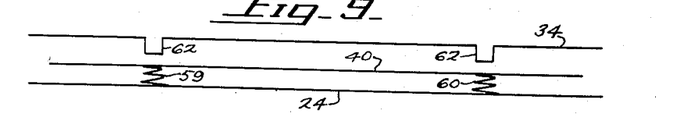
Figure 9 is a similar view showing the relation of the parts upon still further energization of the motor.

To clarify the action of the diaphragm 40, the shoulders 62 and the springs 59 and 60, reference is made to the diagrammatic showings in Figures 7, 8 and 9. When the motor is de-energized, and during initial energization of the motor when only the lower portion of the diaphragm is affected by pressures in the chambers 52 and 53, the diaphragm 40 will bear against both shoulders 62 as in Figure 7, being held against such shoulders by the springs 59 and 60. During initial energization of the motor, the diaphragm 40 and the plate 47 which carries the flange 49, will rock on the shoulders 62. As differential pressures increase, the force of the spring 59 first will be overcome and the parts will now occupy the positions shown in Figure 8. The diaphragm 40 now will be moved against the compression of the spring 59 away from the associated shoulder 62 as indicated in Figure 8.

When differential pressures reach the point where the spring 60 can no longer overbalance the differential pressures, the diaphragm 40 will move away from the shoulder 62 associated with the spring 60. The diaphragm then will float out of contact with the shoulders 62 and when the motor is energized to a sufficient extent, all portions of the diaphragm will be effective for transmitting forces from the flange 49 to the radially outer ends of the lever elements 67. The parts will then occupy the portions shown in Figure 9 and will remain in such positions throughout the rest of the operation of the motor for a full application of the brakes.

From the foregoing it will be apparent that the restriction provided by the clearance 30 prevents the pressure responsive unit of the motor from "jumping" away from off position. This initial relatively restricted energization of the motor, however, is taken advantage of for supplementing the action of the spring 31 since the lower portion of the diaphragm 40 is not biased to off position and therefore does not offer appreciable resistance to low differential pressures in the chambers 52 and 53. Thus it will be apparent that even though initial energization of the motor is restricted, a very slight rise in pressure in the chamber 53 moves the lower portion of the diaphragm to transmit reaction forces to the valve 77 and consequently to the brake pedal, such resistance being proportional to the degree of motor energization.

The application of reaction forces accordingly takes place in stages which are so smoothly progressive that they are not felt by the operator. In the first stage, initial brake pedal movement takes place solely against the spring 31. In the second stage, during initial energization of the motor, solely the lower portion of the diaphragm 40 is acted upon by differential pressures to react against movement of the valve. In this second stage, of course, the reaction forces progressively increase as motor energization increases until the third stage is reached. In this third stage, the spring 59 is overcome to render a greater portion of the diaphragm area effective against the lever elements 67. The fourth stage is then reached in which the spring 60 is overcome. During the third and fourth stages, reaction forces also progressively increase in accordance with the increase in motor energization. When the point of power "run-out" is reached, that is, when the motor is energized to its maximum extent, the apparatus enters a fifth stage of operation as indicated in Figure 3, direct forces being transmitted from the valve to the plunger 16. During this stage, the operator applies progressively increasing pressure to the brake pedal to assist the motor for a full brake application. In this stage also, therefore, reaction forces against the valve progressively increase.

It will be apparent therefore that the operation of the apparatus is divided into a plurality of stages in each of which progressively increasing reaction forces will be applied to the valve. The transition to each successive stage, therefore, takes place smoothly and without any suggestion of "lumpiness" up to the point of full brake application. As a result, the operator feels from the very first pressure upon the brake pedal a progressively increasing resistance to movement of his foot, which results in extremely smooth brake operation while still preserving the highly desirable "soft" pedal, that is, an operation in which very low initial resistance to the foot is encountered.

It will be noted in Figure 1 that the collar 65 is spaced from the adjacent end of the plunger 16 and, accordingly, the valve 77 is initially free to move to the right solely against the compression of the spring 31. During initial energization of the motor, some of the play between the collar 65 and plunger 16 will be taken up, as shown in Figure 2. In later stages of operation (Figure 3), movement will be transmitted directly from the valve 77 through the inner ends of the lever elements 67 to engage the collar 65 with the adjacent end of the plunger 16. From such point up to the point of maximum brake application, all of the interior parts of the motor move as a unit.

The parts obviously will return to normal position upon the releasing of the brake pedal and the returning of the valve 77 to the off position shown in Figure 1. When the brake pedal is released, the spring 31 will promptly return the valve 77 to its normal off position, with the valve element 84 engaging the seat 85 and with the grooves 76 and 78 communicating with the ports 74. Thus, the chamber 55 will be cut off from the atmosphere and will be connected to the motor chamber 54 to again vacuum-suspend the motor, and the spring 29 will move the pressure responsive unit 22 fully to its off position shown in Figure 1. Obviously, under all conditions, the valve 77 provides a follow-up action of the pressure responsive unit 22 and fluid displacing plunger 16 relative to operation of the brake pedal and the valve 77.

It is to be understood that the form of the invention shown and described is for the purpose of illustration, the invention being defined in the appended claims.

I claim:

1. A fluid motor mechanism comprising a casing having a pressure responsive unit therein, a power operable member connected to said unit, a follow-up valve in said pressure responsive unit having a normal position balancing pressures in said motor and being movable in one direction from such position to establish differential pressures in said motor to move said pressure responsive unit, a plurality reaction elements engageable with said valve, and means engageable with said elements and including portion independently responsive to progressively increasing differential pressures occurring incident to progressive energization of said motor for applying progressively increasing reaction forces through said elements to said valve to oppose movement thereof from said normal position.

2. A fluid motor mechanism comprising a casing having a pressure responsive unit therein, a power operable member connected to said unit, a follow-up valve in said pressure responsive unit having a normal position balancing pressures in said motor and being movable in one direction from such position to establish differential pressures in said motor to move said pressure responsive unit, a plurality of segmental lever elements surrounding the axis of said motor, said pressure responsive unit having a first annular flange engaging said lever elements near the outer ends thereof and at one side thereof, a second annular flange carried by said power operable member and engaging the other sides of said lever elements radially inwardly of said first flange, said lever elements having portions radially inwardly of said second flange engaging said valve to transmit forces thereto upon rocking movement of said lever elements about said second flange, and means connected for applying forces progressively to successive lever elements by said first flange upon the progressive energization of said motor.

3. A mechanism constructed in accordance with claim 2 wherein the means for applying forces to said lever elements by said first flange comprises a device connected to be responsive to differential pressures in said motor.

4. A mechanism constructed in accordance with claim 2 wherein said pressure responsive unit divides said motor casing to form a pair of chambers one of which is a constant pressure chamber, said means for applying forces to said lever elements by said first flange comprising a diaphragm carrying said first flange and having opposite sides connected to be subject to pressures in said motor chambers.

5. A mechanism constructed in accordance with claim 2 wherein said pressure responsive unit divides said motor casing to form a pair of chambers one of which is a constant pressure chamber, said means for applying forces to said lever elements by said first flange comprising a diaphragm carrying said first flange and having opposite sides connected to be subject to pressures in said motor chambers, and spring means wholly to one side of the axis of said motor connected to bias said diaphragm to move said first flange away from said lever elements, said diaphragm at the opposite side of said motor axis being freely movable to be responsive to any differential pressures in said motor chambers.

6. Apparatus constructed in accordance with claim 2 wherein said pressure responsive unit divides said casing to form a pair of motor chambers, and wherein said valve, in said normal position, connects said motor chambers to each other and moves from such normal position to disconnect said motor chambers from each other and to connect one of said chambers to a source of relatively high pressure, means connected to be operative during initial movement of said valve from said normal off position for restricting communication between said one motor chamber and said source of relatively high pressure to retard initial energization of said motor, said means for applying forces to said lever elements by said first flange comprising a diaphragm carrying said first flange and having opposite faces connected to be subject to pressures in said motor chambers, and means connected to bias said diaphragm solely at one side of the axis of said motor to move said first flange away from said lever elements.

7. A fluid motor mechanism comprising a casing having a pressure responsive unit therein dividing said casing to form a pair of chambers one of which is a constant pressure chamber in communication with a source of relatively low pressure, a power operable member connected to said pressure responsive unit, a follow-up valve movable between a normal off position connecting said motor chambers to each other and a motor energizing position in which said chambers are disconnected from each other and the other motor chamber is connected to a source of higher pressure, means separate from said valve for restricting the admission of pressure fluid from said higher pressure source to said other motor chamber upon movement of said valve from said normal off position, and means for applying to said valve to oppose movement thereof from its normal off position reaction forces of progressively increasing ratios to differential pressures in said motor chambers.

8. A mechanism constructed in accordance with claim 7 wherein the means for applying reaction forces to said valve comprises a plurality of segmental lever elements.

9. A mechanism constructed in accordance with claim 7 wherein the means for applying reaction forces to said valve comprises a plurality of segmental lever elements, a first annular flange engaging said lever elements at one side and adjacent the radially outer ends thereof, a second flange fixed with respect to said power operable member radially inwardly of said first flange and engaging the other side of said lever elements, said lever elements at said one side thereof and radially inwardly of said second flange engaging said valve, and means connected to be responsive to differential pressures in said motor chambers for variably applying forces through said first flange to said lever elements.

10. A mechanism constructed in accordance with claim 7 wherein the means for applying reaction forces to said valve comprises a plurality of segmental lever elements, a first annular flange engaging said lever elements at one side and adjacent the radially outer ends thereof, a second flange fixed with respect to said power operable member radially inwardly of said first flange and engaging the other side of said lever elements, said lever elements at said one side thereof and radially inwardly of said second flange engaging said valve, and a diaphragm carrying said first flange and having opposite sides connected to be subject to pressures in said motor chambers.

11. A mechanism constructed in accordance with claim 7 wherein the means for applying reaction forces to said valve comprises a plurality of segmental lever elements, a first annular flange engaging said lever elements at one side and adjacent the radially outer ends thereof, a second flange fixed with respect to said power operable member radially inwardly of said first flange and engaging the other side of said lever elements, said lever elements at said one side thereof and radially inwardly of said second flange engaging said valve, a diaphragm carrying said first flange and having opposite sides connected to be subject to pressures in said motor chambers, and spring means wholly to one side of the axis of said motor connected to bias adjacent portions of said first flange away from said lever elements.

12. A mechanism constructed in accordance with claim 7 wherein the means for applying reaction forces to said valve comprises a plurality of segmental lever elements, a first annular flange engaging said lever elements at one side and adjacent the radially outer ends thereof, a second flange fixed with respect to said power operable member radially inwardly of said first flange and engaging the other side of said lever elements, said lever elements at said one side thereof and radially inwardly of said second flange engaging said valve, a diaphragm carrying said first flange and having opposite sides connected to be subject to pressures in said motor chambers, and means connected to eccentrically bias said first flange away from said lever elements.

13. A fluid motor mechanism comprising a casing having a pressure responsive unit therein dividing it to form a pair of chambers, a power operable member connected to said pressure responsive unit, means for connecting one of said chambers to a source of relatively low pressure, a coaxial sleeve carried by said pressure responsive unit and having a first port communicating with the other motor chamber, a valve slidable in said sleeve and having a normal position connecting said first port to said one chamber, and means slidably supporting said sleeve relative to said casing and comprising a bearing, said sleeve having a second port longitudinally spaced from said first port and arranged within said bearing when said valve is in said normal position, said valve being movable in one direction from said normal position to close communication between said first port and said one chamber and to open said second port to a source of higher pressure, said bearing and said sleeve providing a restricted passage between said second port and said other motor chamber whereby communication of said other chamber with said source of higher pressure is restricted until said pressure responsive unit moves said second port beyond said bearing.

14. A fluid motor mechanism comprising a casing having a pressure responsive unit therein dividing it to form a pair of chambers, a power operable member connected to said pressure responsive unit, means for connecting one of said chambers to a source of relatively low pressure, a coaxial sleeve carried by said pressure responsive unit and having a first port communicating with the other motor chamber, a valve slidable in said sleeve and having a normal position connecting said first port to said one chamber, means slidably supporting said sleeve relative to said casing and comprising a bearing, said sleeve having a second port longitudinally spaced from said first port and arranged within said bearing when said valve is in said normal position, said valve being movable in one direction from said normal position to close communication between said first port and said one chamber and to open said second port to a source of higher pressure, said bearing and said sleeve providing a restricted passage between said second port and said other motor chamber whereby communication of said other chamber with said source of higher pressure is restricted until said pressure responsive unit moves said second port beyond said bearing, and means connected for applying to said valve reaction forces proportional to differential pressures in said motor chambers to oppose movement of said valve from said normal position.

15. A mechanism constructed in accordance with claim 14 wherein said means for applying reaction forces to said valve comprises a circumferential series of segmental elements having inner end portions bearing against one end of said valve.

16. A mechanism constructed in accordance with claim 14 wherein said means for applying reaction forces to said valve comprises a plurality of segmental lever elements surrounding the axis of said motor and each having a radially inner end portion at one side thereof bearing against one end of said valve, an annular fulcrum flange fixed to said power operable member and engaging said lever elements at the other side thereof radially outwardly of said inner end portions thereof, a second annular flange radially outwardly of said fulcrum flange engaging said lever elements at said one side thereof, and means connected to be responsive to differential pressures in said motor chambers for applying forces from said second flange to said lever elements.

17. A mechanism constructed in accordance with claim 14 wherein said means for applying reaction forces to said valve comprises a plurality of segmental lever elements surrounding the axis of said motor and each having a radially inner end portion at one side thereof bearing against one end of said valve, an annular fulcrum flange fixed to said power operable member and engaging said lever elements at the other side thereof radially outwardly of said inner end portions thereof, a second annular flange radially outwardly of said fulcrum flange engaging said lever elements at said one side thereof, means connected to be responsive to differential pressures in said motor chambers for applying forces from said second flange to said lever elements, and means connected for eccentrically biasing said second flange away from said lever elements.

18. A mechanism constructed in accordance with claim 14 wherein said means for applying reaction forces to said valve comprises a plurality of segmental lever elements surrounding the axis of said motor and each having a radially inner end portion at one side thereof bearing against one end of said valve, an annular fulcrum flange fixed to said power operable member and engaging said lever elements at the other side thereof radially outwardly of said inner end portions thereof, a second annular flange radially outwardly of said fulcrum flange engaging said lever elements at said one side thereof, and a diaphragm carried by said pressure responsive unit and to which said second flange is connected, said diaphragm dividing said pressure responsive unit to form a pair of chambers communicating respectively with said motor chambers whereby said diaphragm is subject to differential pressures in said motor chambers to move said second flange against said lever elements.

19. A mechanism constructed in accordance with claim 14 wherein said means for applying reaction forces to said valve comprises a plurality of segmental lever elements surrounding the axis of said motor and each having a radially inner end portion at one side thereof bearing against one end of said valve, an annular fulcrum flange fixed to said power operable member and engaging said lever elements at the other side thereof radially outwardly of said inner end portions thereof, a second annular flange radially outwardly of said fulcrum flange engaging said lever elements at said one side thereof, a diaphragm carried by said pressure responsive unit and to which said second flange is connected, said diaphragm dividing said pressure responsive unit to form a pair of chambers communicating respectively with said motor chambers whereby said diaphragm is subject to differential pressures in said motor chambers to move said second flange against said lever elements, and spring means interposed between said pressure responsive unit and said diaphragm wholly to one side of the axis of said motor and connected to bias the adjacent portions of said second flange away from said lever elements.

20. A fluid motor mechanism comprising a casing having a pressure responsive unit therein, a power operable member connected to said pressure responsive unit, a follow-up valve in said pressure responsive unit having a normal position balancing pressures in said motor and being movable in one direction from such position to establish differential pressures in said motor to energize it, an annular diaphragm in said pressure responsive unit forming therewith a pair of chambers each communicating with one end of said motor, means connected for transmitting forces from said diaphragm, occurring incident to energization of said motor to said valve to oppose movement thereof in said direction, means connected to bias said diaphragm wholly to one side of the axis thereof to a normal position to hold the corresponding portion of said diaphragm in such position until predetermined differential pressures are built up in said motor, and at least one shoulder carried by said pressure responsive unit and against which the biased portion of said diaphragm seats in normal position.

21. A mechanism constructed in accordance with claim 20 wherein said means connected to bias said diaphragm wholly to one side of the axis thereof to a normal position comprises a pair of circumferentially spaced springs, there being two of said shoulders limiting movement of the biased portion of said diaphragm to said normal position, said shoulders corresponding in position to said springs and serving as fulcrum shoulders for the rocking of said diaphragm when said motor is energized below the point necessary to overcome the tension of said springs.

22. A fluid motor mechanism comprising a casing having a pressure responsive unit therein, a power operable member connected to said pressure responsive unit, a follow-up valve in said pressure responsive unit having a normal position balancing pressures in said motor and being movable in one direction from such position to establish differential pressures in said motor to energize it, an annular diaphragm in said pressure responsive unit forming therewith a pair of chambers each communicating with one end of said motor, a plurality of radial lever elements concentric with the axis of said valve and said diaphragm and having radially inner ends engaging said valve at one side of said lever elements, a first annular flange carried by said diaphragm at said side of said lever elements and engaging the latter adjacent the radially outer ends thereof, a second annular flange fixed with respect to said pressure responsive unit and engaging said lever elements intermediate the ends thereof at the other side thereof, said first flange, upon movement of said diaphragm incident to energization of said motor, being engageable against said lever elements to rock the latter and apply force from the inner ends thereof to said valve to oppose movement thereof in said direction, a pair of circumferentially spaced shoulders fixed to said pressure responsive unit engaging said diaphragm wholly to one side of the axis of said motor to limit movement of said diaphragm to a normal position, and a pair of springs corresponding in position and connected to said shoulders to maintain said diaphragm in contact therewith until said motor is energized to a predetermined extent, said diaphragm at the other side of said axis being freely movable, said shoulders forming a fulcrum support for said diaphragm during movement thereof at said other side of said axis until differential pressures in said motor are sufficient to overcome the forces of said springs.

23. A mechanism constructed in accordance with claim 22 wherein one of said springs is weaker than the other to be overcome at lower differential motor pressures than said other spring.

References Cited in the file of this patent
UNITED STATES PATENTS

| | | |
|---|---|---|
| 1,620,513 | Bragg et al. | Mar. 8, 1927 |
| 2,212,955 | Price et al. | Aug. 27, 1940 |
| 2,307,910 | Baade | Jan. 12, 1943 |
| 2,457,721 | Price | Dec. 28, 1948 |
| 2,580,262 | Worst | Dec. 25, 1951 |
| 2,585,940 | Juilfs | Feb. 19, 1952 |
| 2,685,170 | Price | Aug. 3, 1954 |
| 2,690,740 | Hupp | Oct. 5, 1954 |